(12) United States Patent
Cox et al.

(10) Patent No.: US 8,242,228 B2
(45) Date of Patent: Aug. 14, 2012

(54) LOW HAZE THERMOPLASTIC POLYURETHANE USING MIXTURE OF CHAIN EXTENDERS INCLUDING 1,3- AND 1,4-CYCLOHEXANEDIMETHANOL

(76) Inventors: John M. Cox, Lake Jackson, TX (US); Francisco Lerma, Lake Jackson, TX (US); Mark F. Sonnenschein, Midland, MI (US)

( * ) Notice: Subject to any disclaimer, the term of this patent is extended or adjusted under 35 U.S.C. 154(b) by 137 days.

(21) Appl. No.: 12/593,377

(22) PCT Filed: Dec. 3, 2007

(86) PCT No.: PCT/US2007/024753
§ 371 (c)(1),
(2), (4) Date: Sep. 28, 2009

(87) PCT Pub. No.: WO2008/121133
PCT Pub. Date: Oct. 9, 2008

(65) Prior Publication Data
US 2010/0113733 A1 May 6, 2010

Related U.S. Application Data

(60) Provisional application No. 60/920,642, filed on Mar. 29, 2007.

(51) Int. Cl.
*C08G 18/00* (2006.01)
(52) U.S. Cl. ........... 528/65; 528/44; 528/59; 528/66; 528/80; 528/81; 528/85; 252/182.2; 252/182.21; 252/182.22; 252/182.25; 252/182.28

(58) Field of Classification Search .......... 528/44, 528/59, 65, 66, 80, 81, 85; 252/182.2, 182.21, 252/182.22, 182.25, 182.28
See application file for complete search history.

(56) References Cited

U.S. PATENT DOCUMENTS

| | | | |
|---|---|---|---|
| 4,245,081 A * | 1/1981 | Quiring et al. | 528/65 |
| 6,187,968 B1 | 2/2001 | Itoh et al. | |
| 6,521,164 B1 * | 2/2003 | Plummer et al. | 264/328.17 |
| 2002/0123601 A1 | 9/2002 | Sonnenschein et al. | |
| 2009/0104449 A1 * | 4/2009 | Farah et al. | 428/422.8 |
| 2009/0198014 A1 * | 8/2009 | Baikerikar et al. | 524/849 |

FOREIGN PATENT DOCUMENTS

EP 0781792 A 7/1997

OTHER PUBLICATIONS

Paint & Coatings Industry, UNOXOL Diol: A new liquid cycloaliphatic diol for coating applications. Jun. 2006. Presented by Argyropoulus, John et al.*
A new liquid cycloaliphatic diol for coating Appications. Argyropoulos, John et al. Presented at the International Waterborne, High-Solids, and Powder Coatings Symposium, Feb. 26-28, 2003, New Orleans, LA, USA. p. 1-8.*

* cited by examiner

*Primary Examiner* — Ling Choi
*Assistant Examiner* — Michael L Leonard
(74) *Attorney, Agent, or Firm* — Christopher P. Demas; Thoburn T. Dunlap

(57) ABSTRACT

The present invention is a low haze thermoplastic polyurethane (TPU) prepared from a chain extender mixture that includes an acyclic diol and a mixture of 1,3- and 1,4-cyclohexanedimethanol. The TPU elastomers exhibit good optical clarity, particularly when formed into relatively thick injection molded parts.

18 Claims, No Drawings

LOW HAZE THERMOPLASTIC POLYURETHANE USING MIXTURE OF CHAIN EXTENDERS INCLUDING 1,3- AND 1,4-CYCLOHEXANEDIMETHANOL

This application claims priority from PCT Application Serial No. PCT/US2007/24753 filed on Dec. 3, 2007, which claims the benefit of U.S. Provisional Application No. 60/920,642 filed Mar. 29, 2007.

This invention relates to thermoplastic polyurethanes.

Thermoplastic polyurethane ("TPU") elastomers are used in a variety of applications such as gears, bearings, joints for precision machinery, parts for electronic instruments, soles, bladders and uppers for athletic shoes and ski boots, automotive parts, seals, gaskets and packings for hydraulic fluid systems, as well as other applications. TPU elastomers are typically the reaction product of one or more diisocyanate compounds, one or more high equivalent weight diols and one or more chain extenders.

It is sometimes desirable that the TPU elastomer exhibits good optical clarity, for functional or aesthetic reasons, or both. An example of this is footwear applications, in which uppers, air or gel bladders, and elements of soles (such as cleats, for example) are sometimes desired to be clear for reasons of appearance. In addition to being clear, the TPU elastomer must meet other performance criteria for the particular application. In footwear applications, abrasion resistance and permeability to moisture are important attributes. The TPU elastomer must also exhibit a hardness that is suitable for the intended application.

A wide variety of polyols, chain extenders and polyisocyanate have been proposed for use in TPU elastomer applications. See, e.g., U.S. Pat. Nos. 3,214,411, 4,371,684, 4,980, 445, 5,013,811, 5,648,447, 6,521,164 and 7,045,650, among many others. In some cases, it has been proposed to use mixtures of polyols and/or chain extenders to make TPU elastomers. For example, U.S. Pat. Nos. 4,371,684 and 6,521, 164 each describes the use of particular chain extender mixtures in manufacturing TPU elastomers.

Many commercially-used soft- to moderately hard (Shore A durometer hardness of 60 to a Shore D durometer hardness of about 75) TPU elastomer formulations are based on 1,4-butanediol as the chain extender. 1,4-butanediol-based systems often provide a good balance of properties at reasonable cost, compared to systems that are based on other chain extenders. One problem with some 1,4-butanediol-based systems is that they tend to exhibit a significant amount of haze, or loss of optical clarity. The problem with haze is particularly severe in thicker parts. As the part becomes thicker, the loss of optical clarity is often greater than would be expected due to the mere increase in the part thickness. It would be desirable to provide a TPU elastomer that is economical, has good mechanical properties and exhibits good optical clarity. The hardness of the TPU elastomer suitably is between a Shore A durometer hardness of 60 and a Shore D durometer hardness of 75.

This invention is a thermoplastic polyurethane (TPU) elastomer which is a polymer of (1) at least one high equivalent weight, difunctional compound, (2) a chain extender mixture and (3) at least one diisocyanate, wherein the chain extender mixture includes at least 60 mole-% of an acyclic diol or diamine having a molecular weight of up to about 400 and at least 8 mole-% of a mixture of cyclohexanedimethanol (CHDM) isomers, the mixture of cyclohexanedimethanol isomers including at least 20 weight percent each of 1,3-cyclohexanedimethanol and 1,4-cyclohexanedimethanol.

As used herein, the term "thermoplastic polyurethane" or "TPU" in intended as a shorthand to include materials having urethane groups (as are formed in the reaction of hydroxyl-containing compounds with isocyanate-containing compounds) as well as materials having both urethane and urea groups (as are formed in the reaction of isocyanate-containing compounds with both hydroxyl-containing compounds and compounds that contain primary or secondary amino groups).

In another embodiment, the invention is a TPU elastomer which is a polymer of (1) at least one high equivalent weight poly(caprolactone) diol or mixture thereof with one or more other high equivalent weight diols, (2) a chain extender mixture that includes at least 60 mole-% of 1,4-butanediol and at least 8 mole-% of a mixture of cyclohexanedimethanol isomers, and (3) at least one diisocyanate, wherein the mixture of cyclohexanedimethanol isomers includes at least 40 weight percent each of 1,3-cyclohexanedimethanol and 1,4-cyclohexanedimethanol.

The TPU elastomers of the invention often have better optical clarity, particularly when molded into thicker parts, than similar TPU elastomers that use only 1,4-butanediol as the chain extender.

The chain extender mixture used in the present invention is a mixture containing at least two components. The first component is an acyclic diol or diamine, which has a molecular weight of up to about 400 and preferably up to about 250. Diol chain extenders are preferred. The acyclic diol or diamine chain extender constitutes at least 60 mole percent of the chain extender mixture. In preferred embodiments, the acyclic diol or diamine chain extender constitutes at least 80 mole percent of the chain extender mixture and it may constitute up to 92 mole-% of the chain extender mixture. A mixture of acyclic diols and diamines may be used as the first component of the chain extender mixture.

Examples of acyclic diol chain extenders include, for example, ethylene glycol, diethylene glycol, 1,3-propanediol, dipropylene glycol, tripropylene glycol, 1,4-butanediol, 1,6-hexanediol, 1,5-heptanediol and the like. Examples of acyclic diamine chain extenders include ethylene diamine, 2-methyl-1,5-pentanediamine, 1,6-hexanediamine, and the like. 1,4-butanediol is most preferred among these.

The second component of the chain extender mixture is a mixture of 1,3-cyclohexanedimethanol and 1,4-cyclohexanedimethanol. The ratio of 1,3-cyclohexanedimethanol to 1,4-cyclohexanedimethanol units can vary from about 20:80 to 80:20. A preferred ratio of these is from about 65:35 to 35:65 by weight. A more preferred ratio is from about 60:40 to about 40:60 by weight. The 1,3-cyclohexanedimethanol and 1,4-cyclohexanedimethanol each can be the cis-isomer, the trans-isomer, or a mixture of both cis- and trans-isomers. The most preferred cyclohexanedimethanol mixture contains all four of cis-1,3-cyclohexanedimethanol, trans-1,3-cyclohexanedimethanol, cis-1,4-cyclohexandimethanol and trans-1,4-cyclohexane dimethanol, and in which the 1,3-isomers constitute from 40 to 60% by weight of the mixture and the 1,4-isomers constitute from about 60 to 40% by weight of the mixture.

The cyclohexanedimethanol mixture constitutes at least 8 mole percent of the chain extender mixture. It may constitute up to 40 mole percent of the chain extender mixture. It preferably constitutes from 8 to 30 mole percent of the chain extender mixture and even more preferably from 10 to 25 mole percent of the chain extender mixture.

The chain extender mixture may in addition contain one or more other cyclic diols or diamines having molecular weights of up to 400, preferably up to 250. These include, for example, hydroquinone bis-2-hydroxyethyl ether, piperazine, aminoethylpiperazine, isophorone diamine, diethyltoluene diamine, methylene bis (aniline), and the like. These may constitute up to 32 mole-% of the chain extender mixture. They preferably constitute no more than 12 mole-% of the chain extender mixture.

Most preferred chain extender mixtures are made up of only (other than minor amounts of impurities) one or more acyclic diols and the cyclohexanedimethanol mixture. The most preferred chain extender mixture contains (apart from minor amounts of impurities) only 1,4-butanediol and the cyclohexanedimethanol mixture.

The high equivalent weight difunctional compound is a material having nominally 2.0 isocyanate-reactive groups per molecule. For purposes of this invention, a "high equivalent weight" difunctional compound or other isocyanate-reactive material is one having an equivalent weight per isocyanate-reactive group of at least 300. The isocyanate-reactive groups may be, for example, hydroxyl, primary amino, secondary amino or thiol groups. The high equivalent weight isocyanate-reactive groups are preferably aliphatic hydroxyl groups. The hydroxyl equivalent weight preferably is from 300 to 2000 and more preferably from 500 to 1200. Generally, the higher the equivalent weight of the difunctional compound, the greater amount of chain extender that will be needed to obtain a particular hardness.

Suitable high equivalent weight difunctional compounds are described in such publications as High Polymers, Vol. XVI; "Polyurethanes, Chemistry and Technology", by Saunders and Frisch, Interscience Publishers, New York, Vol. I, pp. 32-42, 44-54 (1962) and Vol II. pp. 5-6, 198-199 (1964); Organic Polymer Chemistry by K. J. Saunders, Chapman and Hall, London, pp. 323-325 (1973); and Developments in Polyurethanes, Vol. I, J. M. Burst, ed., Applied Science Publishers, pp. 1-76 (1978). These materials include polyesters (including polylactones), polyethers, polycarbonates, and various other types. In general, polyesters and polyethers, and mixtures thereof, are preferred on the basis of performance, cost and availability.

Suitable polyesters include aliphatic polyesters and aromatic polyesters. Aliphatic polyesters include polymers and copolymers of one or more cyclic lactones (such as caprolactone); polymers and copolymers of hydroxyalkanoic acids such as lactic acid, 3-hydroxypropionic acid or glycolic acid (or cyclic dianhydride dimers thereof such as lactide or glycolide); and A-B type polyesters that correspond to the reaction product of one or more glycols with one or more aliphatic dicarboxylic acids. Aromatic polyesters are generally A-B type polyesters that correspond to the reaction product of at least one glycol with at least one aromatic carboxylic acid. By "corresponding to the reaction product of at least one glycol and at least one (aliphatic or aromatic) dicarboxylic acid", it is meant that the polyester contains repeating units corresponding to the structure of each glycol (after removal of each hydroxyl hydrogen) and repeating units corresponding to the structure of the dicarboxylic acid(s) (after removal of —OH from each carboxylic acid group). This term in not intended to limit the polyester to those made in any particular way. As discussed below, various synthetic schemes can be used to make an A-B type polyester. By "glycol", it is meant a compound having exactly two hydroxyl groups/molecule and a molecular weight of up to 300, preferably up to 200 and more preferably up to 100. A-B type polyesters can be made with small amounts of branching agents (typically polyols having 3 or more hydroxyl groups/molecule), although such branching agents should be used in small proportions.

Examples of useful aliphatic A-B type polyesters include those corresponding to the reaction product of a glycol such as 1,4-butanediol, hydroquinone bis(2-hydroxyethyl)ether, ethylene glycol, diethylene glycol, triethylene glycol, propylene glycol, dipropylene glycol, tripropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,6-hexanediol, 1,2-cyclohexanediol, 1,2-dimethyl-1,2-cyclohexanediol, and the like, with a dicarboxylic acid such as adipic acid, succinic acid, glutaric acid, azelaic acid, sebacic acid, malonic acid, maleic acid or fumaric acid. Of these aliphatic A-B type polyesters, those based on adipic acid, such as poly(propylene adipate), poly(butylene adipate) and poly(ethylene adipate) are particularly preferred. Suitable commercially available grades of adipate polyesters include those sold by Crompton Chemicals under the trade names Fomrez 44-56 and Fomrez 44-57.

Examples of useful aromatic A-B type polyesters include those corresponding to the reaction product of a glycol such as 1,4-butanediol, hydroquinone bis(2-hydroxyethyl)ether, ethylene glycol, diethylene glycol, triethylene glycol, propylene glycol, dipropylene glycol, tripropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,6-hexanediol, 1,2-cyclohexanediol, 1,2-dimethyl-1,2-cyclohexanediol, and the like, with an aromatic dicarboxylic acid such as phthalic acid, isophthalic acid, terephthalic acid, tetrachlorophthalic acid and chlorendic acid. Polymers of isophthalic acid or terephthalic acid with ethylene glycol, diethylene glycol, propylene glycol and 1,4-butanediol are preferred types of A-B aromatic polyesters.

Various reaction schemes can be used to form A-B type polyesters. One or more diacids as described above can be reacted directly with one or more glycols as described above to make the polyester. Alternatively, anhydrides, dialkyl esters and acid halides of the aforementioned dicarboxylic acids may be used as raw materials in the polymerization reaction, instead of or in addition to the dicarboxylic acid itself. It is also possible in some cases to form cyclic oligomers of the glycol(s) and the dicarboxylic acid(s) (or corresponding dialkyl ester(s) or anhydride(s)) and to polymerize the cyclic oligomer to form the polyester. Cyclic oligomers can be prepared by forming a low molecular weight polymer from the polyol(s) and dicarboxylic acid(s) (or corresponding dialkyl ester(s) or anhydride(s)), and depolymerizing the low molecular weight polymer to form the cyclic oligomer(s). The cyclic oligomers may be a cyclic reaction product corresponding to that of one polyol molecule and one dicarboxylic acid molecule, or may be have a higher degree of polymerization.

An especially preferred polyester is a polycaprolactone. Polycaprolactones are readily commercially available.

Another preferred type of high equivalent weight difunctional compound is a polyether diol. Various types of polyether diols are suitable, including, for example, polymers of ethylene oxide, propylene oxide, 1,2-butylene oxide, 2,3-butylene oxide, tetramethylene oxide, and the like. Copolymers of two or more of these can be used. Preferred polyether diols include homopolymers of propylene oxide, random copolymers of propylene oxide and up to 20 weight percent ethylene oxide, propylene oxide-ethylene oxide random copolymers having terminal poly(ethylene oxide) end-caps, and poly(tetramethylene oxide). Polyether diols of these types are described in "Polyurethanes: Chemistry and Technology," Part 1. Chemistry, by J. H. Saunders and K. C.

Frisch, Interscience, New York, 1962, pp. 36-37, and "Advances in Urethane Science and Technology" by K. C. Frisch and S. L. Reegan, Technomic Publishing Company, Westport, Conn. 1973, pp. 188-193.

Certain commercially available polyether diols, particularly polymers and copolymers of propylene oxide, tend to contain a certain amount of monofunctional impurities, and for that reason tend to have actual hydroxyl functionalities which are somewhat less than 2.0, such as from 1.6 to 1.99. These commercially available polyether diols are suitable for use herein. In such a case, it is also within the scope of the invention to mix the polyether diol with another high equivalent weight polyether polyol having a higher nominal functionality, particularly one having a nominal functionality of 3.0. If desired, the relative proportions of the diol and higher functionality polyol can be selected so that the average actual functionality of the mixture is close to 2.0, such as from 1.9 to 2.2 or from 1.9 to 2.05.

Similarly, it is within the scope of the invention to use one or more polyether diols which have low levels of monofunctional impurities. The monofunctional impurities usually have unsaturated terminal groups. Therefore, the level of monofunctional impurities in a polyether diol or polyol can be expressed in terms of the amount of that terminal unsaturation. If desired, the polyether diol or polyol can have no more than 0.02 milliequivalents of terminal unsaturation per gram. The amount of terminal unsaturation per gram can be no more than 0.01 meq/g, or from 0.002 to 0.008 meq/g. Polyether diols and polyols having such low levels of unsaturation can be prepared using a variety of well-known double metal cyanide catalyst (DMC) complexes.

Diisocyanates suitable for use in preparing the hard segment of the TPU's according to this invention are well known in the art and include aromatic, aliphatic, and cycloaliphatic diisocyanates and combinations thereof. Representative examples of these diisocyanates can be found in U.S. Pat. Nos. 4,385,133; 4,522,975; and 5,167,899, which teachings are incorporated herein by reference. Preferred diisocyanates include 4,4'-diisocyanatodiphenylmethane (4,4'-MDI), 2,4'-diisocyanatodiphenylmethane (2,4'-MDI), p-phenylene diisocyanate, 1,3-bis(isocyanatomethyl)-cyclohexane, 1,4-diisocyanato-cyclohexane, hexamethylene diisocyanate, isophorone diisocyanate, 1,5-naphthalene diisocyanate, 3,3'-dimethyl-4,4'-biphenyl diisocyanate, 4,4'-diisocyanato-dicyclohexylmethane, 2,6-toluene diisocyanate and 2,4-toluene diisocyanate. More preferred are 4,4'-diisocyanato-dicyclohexylmethane and 4, diisocyanato-diphenylmethane. Most preferred is 4,4'-MDI.

In addition to the foregoing materials, a small quantity of crosslinkers may be used in making the TPU elastomer. These materials can be used in amounts that do not result in the formation of gels during initial polymerization or subsequent melt processing operations. Crosslinkers are materials having three or more isocyanate-reactive groups per molecule and an equivalent weight per isocyanate-reactive group of less than 300, preferably less than 200 and especially from 30 to 150. Examples of crosslinkers include glycerine, trimethylolpropane, pentaerythritol, tetraethylene triamine, sorbitol, glucose, triethanolamine, diethanolamine, triisopropanolamine, diisopropanolamine, alkoxylated derivatives of any of the foregoing, and the like.

In addition, small amounts of a high equivalent weight material having 3 or more isocyanate-reactive groups can be used to make the TPU elastomer. As discussed before, these may be added in some embodiments to compensate for monofunctional impurities that are present in some diols. They may also be used modify the rheological properties of the molten TPU or for other purposes related to processing. These materials can be used in amounts that do not result in the formation of gels during initial polymerization or subsequent melt processing operations. It is preferred to omit these materials.

Similarly, small amounts of a polyisocyanate having 3 or more isocyanate groups can be used to make the TPU elastomer. If present at all, these materials suitably are used in amount such that the average isocyanate functionality of all isocyanate compounds does not exceed 2.3, preferably 2.1, isocyanate groups per molecule. It is preferred to omit these materials.

The ratios of the foregoing components are selected together to form a polymer which is both thermoplastic and elastomeric. TPU elastomers can be characterized by their Shore durometer hardness. The TPU elastomer suitably has a Shore A durometer hardness of at least 60. The TPU elastomer may have a Shore D durometer up to 75 or even higher. The Shore A durometer hardness of the TPU elastomer is for some applications preferably at least 75 and more preferably at least 80. For some applications, the Shore A durometer hardness is preferred to be not greater than 100 and more preferred to be not greater than 95.

The hardness of the TPU elastomer is usually related to its "hard segment" content. "Hard segment" content refers to the proportion of the TPU elastomer that is made up of polymerized isocyanates, chain extenders and any crosslinkers that may be present. The TPU elastomer generally has a Shore A hardness as described before when the hard segment content is from about 20 to about 80% of the total weight of the TPU elastomer (not counting additives that do not form part of the polyurethane polymer). That is, $$20\% \le \frac{100\% \; X(W_{CE} + W_I + W_{XL})}{W_{CE} + W_I + W_{XL} + W_{HEW}} \le 80\%$$

where $W_{CE}$ is the combined weight of all chain extenders, $W_I$ is the combined weight of all isocyanate compounds, $W_{XL}$ is the combined weight of all crosslinkers (if any) and $W_{HEW}$ is the combined weight of all high equivalent weight isocyanate-reactive materials. Preferably, the hard segment content is from 30 to 70% by weight. An especially preferred hard segment is from 35 to 55% by weight. An advantage of this invention is that good optical clarity can be obtained even in elastomers having somewhat high hard segment contents, such as above 35% by weight.

The soft segment content corresponds to the proportion of high equivalent weight isocyanate-reactive materials used to make the TPU elastomer, and equals 100% minus the hard segment content. The soft segment content is therefore generally from 20 to 80% by weight, more preferably from 30 to 70% by weight and more preferably from 45 to 65% by weight.

The isocyanate index is the ratio of equivalents of isocyanate groups per equivalent of isocyanate-reactive groups in the reactive mixture used to make the TPU elastomer. The isocyanate index is preferably from 0.95 to 1.20. It is more preferably up to and including about 1.08, still more preferably up to and including about 1.05, and even more preferably up to and including about 1.01.

The TPU elastomer of the invention is conveniently prepared by forming a reaction mixture containing the high equivalent weight difunctional compound, the chain extender mixture, and the diisocyanate (and optional reactive materials such as described before, if any), under conditions such that they react to form a high equivalent weight, thermoplastic polymer. Conditions for the reaction of such starting materials are well known and described, for example, in U.S. Pat. Nos. 3,214,411, 4,371,684, 4,980,445, 5,013,811, 5,648,447, 6,521,164 and 7,045,650. The reaction conditions include the application of heat to drive the polymerization reaction, and may include the presence of a polymerization catalyst. The materials may be heated separately before bringing them together react to form the TPU elastomer. The starting materials are preferably reacted in the substantial absence of water, as water will react with the diisocyanate to form polyurea linkages and generate carbon dioxide.

If desired, the polymerization may be conducted in stages by first reacting the diisocyanate with all or a portion of the chain extender mixture or the high equivalent weight difunctional compound to form a prepolymer. The prepolymer is then caused to react with the remainder of the isocyanate-reactive materials to advance the prepolymer and form the TPU elastomer.

The polymerization is preferably performed in a reactive extrusion process. In such a process, the starting materials are charged into an extrusion device (such as a single-screw or twin-screw extruder), which is heated to the polymerization temperature. The starting materials may be preheated to the polymerization temperature prior to charging them into the apparatus. The reaction mixture then passes through a heated zone where the polymerization takes place. The molten polymer is then extruded through a die. In most cases, it will be cooled and formed into flakes or pellets for use in subsequent melt processing operations, although it is possible to perform the melt processing operation in combination with the polymerization reaction.

Various types of optional components can be present during the polymerization reaction, and/or incorporated into the TPU elastomer.

It is usually preferable to incorporate one or more antioxidants into the TPU elastomer. These may be added during the polymerization reaction, or blended into the previously-formed polymer. Suitable antioxidants include phenolic types, organic phosphites, phosphines and phosphonites, hindered amines, organic amines, organo sulfur compounds, lactones and hydroxylamine compounds. For applications in which transparency is wanted, the antioxidant is preferably soluble in the TPU elastomer, or dispersable therein as very fine droplets or particles. Many suitable antioxidant materials are available commercially. These include Irganox™ 1010, Irganox™ MD1024, Irgaphos™ 168, Irgphos™ 126, all available from CIBA Specialty Chemicals, and the like.

A UV stabilizer is another preferred additive, particularly in applications in which transparency is wanted or in which the part will be exposed to sunlight or other sources of ultraviolet radiation. UV stabilizers include substituted benzophenones, benzotriazoles and benzoxazinones, substituted triazines, hindered amines as well as diphenyl acrylate types. These materials are available commercially from Cytek Industries, Ciba Specialty Chemicals and BASF, among other suppliers.

One or more polymerization catalysts may be present during the polymerization reaction. Catalysts for the reaction of a polyisocyanate with polyol and polyamine compounds are well known, and include tertiary amines, tertiary phosphines, various metal chelates, acid metal salts, strong bases, various metal alcoholates and phenolates and metal salts of organic acids. Catalysts of most importance are the tertiary amines and organotin catalysts. It is often preferred to omit such catalysts, for at least two reasons. First, they often tend to catalyze depolymerization reactions when the TPU elastomer is melt-processed, leading to a degradation of the polymer and loss of properties. Second, catalyst residues can impart unwanted color to the TPU elastomer.

Fillers and reinforcing agents can be incorporated into the TPU elastomer, but these are preferably omitted when a transparent part is wanted. Fillers include a wide range of particulate materials, including talc, mica, montmorillonite, marble, granite, milled glass, calcium carbonate, aluminum trihydrate, carbon, aramid, silica, silica-alumina, zirconia, talc, bentonite, antimony trioxide, kaolin, coal-based fly ash, boron nitride and various reclaimed and reground thermoset polyurethane and/or polyurea polymers. Reinforcements include high aspect ratio materials such as platelets and fibers, which can be of glass, carbon, aramid, various other polymers, and the like.

Other optional additives include slip additives, mold release agents, plasticizers, rheology modifiers, colorants, biocides, and the like.

The TPU elastomer of the invention is useful in a wide range of applications. It can be melt processed in a number of ways to form shaped articles such as coatings, films, sealants, gears, bearings, joints for precision machinery, parts for electronic instruments, soles, bladders and uppers for athletic shoes and ski boots, automotive parts, seals, gaskets and packings for hydraulic fluid systems, hose jacketing, tubing, castor wheels, barrier layers for hospital gowns as well as many other parts.

The TPU elastomer of the invention is particularly well-suited for applications in which good optical transparency is needed. TPU elastomers that are chain extended with 1,4-butanediol alone sometimes tend to form optically hazy parts. This is especially the case when thicker (~6 mm or greater) parts are made. Those thicker parts tend to be significantly less transparent than would be expected, compared to thinner parts made from the same material. With this invention, the tendency for thicker parts to exhibit disproportionately low transparency is diminished or even eliminated. As a result, the TPU elastomer of this invention is especially useful for making parts having a thickness of 6 mm or greater, and which are highly transparent.

The good transparency of the TPU elastomer of the invention can be assessed, for comparison purposes, on injection molded parts prepared as follows: The TPU elastomer is dried to less than 200 ppm moisture, and then injection molded into 6.25×87.5×162 mm specimens, using an 80° F. (27° C.) tool. The injection molder barrel temperature is 220° C. at the nozzle and 190° C. in the feed throat with an incremental temperature profile from feed throat to nozzle. Injection speed is 25.4 mm/sec, and the in-mold residence time is 110 seconds. Transparency of the specimens so prepared is conveniently evaluated in accordance with ASTM D 1003-95, using Hunterlab Colorquest Instrument or equivalent device. Transparent TPU elastomers made and tested in this manner often exhibit a % haze of less than 30%, sometimes less than 20% and in preferred cases, 10% or less.

If desired, the TPU elastomer of the invention can be used as a component of a polymer blend that contains at least one other organic polymer. The other organic polymer is preferably miscible with the TPU elastomer of the invention when clear parts are desired, but the TPU elastomer of the invention can also be used in blends with other polymers with which it is not miscible. The other organic polymer(s) in the blend may or may not be elastomeric.

The following examples are for illustrative purposes only and are not intended to limit the scope of this invention. All parts and percentages are by weight unless otherwise indicated.

EXAMPLES 1 AND 2 AND COMPARATIVE SAMPLE A

TPU Elastomer Examples 1 and 2 and Comparative Sample A are prepared from the formulations described in Table 1. The components are dried and directly injected into the feed throat of a twin screw extruder, where they are allowed to fully react at temperatures up to 220° C. The extrudate is passed through a die and subsequently cut under water to form pellets. The water is removed from the pellets using a spin dryer. The pellets are transferred to a desiccant dryer at 80° C. and dried to less than 200 ppm moisture. The dried materials are then injection molded at 220° C. into plaques that are 6.25 mm thick by 87.5 mm wide by 162 mm long, using an 80° F. (27° C.) tool. The injection molder barrel temperature is 220° C. at the nozzle and 190° C. in the feed throat with an incremental thermal profile from feed throat to nozzle. Injection speed is 25.4 mm/sec and the in-mold residence time is 110 seconds. The plaques are tested for haze using a calibrated Hunterlab Colorquest Instrument, in accordance with ASTM D 1003-95. Results are as indicated in Table 1.

TABLE 1

| | Parts by Weight (Equivalents) | | |
|---|---|---|---|
| Raw Material | Ex. 1 | Ex. 2 | Comp. Sample A |
| Polyester diol[1] | 500 (0.5) | 500 (0.5) | 500 (0.5) |
| Polyether diol[2] | 500 (0.5) | 500 (0.5) | 500 (0.5) |
| 1,4-butanediol | 180 (4.0) | 180 (4.0) | 203 (4.5) |
| CHDM mixture[3] | 36 (0.5) | 72 (1.0) | 0 (0) |
| 4,4'-MDI | 687 | 749 | 687 |
| Additive Package[4] | 42 | 44 | 14 |
| % Hard Segment | 46.4 | 48.9 | 46.4 |
| % Haze | 16.2 | 15.0 | 73.5 |

[1] A 2000 molecular weight polycaprolactone diol.
[2] A nominally difunctional poly(propylene oxide) having 13% poly(ethylene oxide) end-caps and a molecular weight of 2000.
[3] A mixture of about 56% 1,3-cyclohexanedimethanol and 44% 1,4-cyclohexanedimethanol. Both of the 1,3- and 1,4- cyclohexanedimethanol are present as mixtures in of the cis- and trans-isomers.
[4] A mixture of a slip agent, one or more antioxidants and one or more UV stabilizers.

The data in Table 1 shows that the use of a chain extender mixture containing about 11 to 20 equivalent % of the mixture of 1,3- and 1,4-CHDM chain extender results in a TPU elastomer that has a very significant improvement in optical clarity (as indicated by lower haze values).

EXAMPLES 3-5 AND COMPARATIVE SAMPLE B

TPU elastomer Examples 3-5 and Comparative Sample B are prepared from the formulations described in Table 2, using the general method described in Examples 1 and 2. Results are as indicated in Table 2.

TABLE 2

| | Parts by Weight (Equivalents) | | | |
|---|---|---|---|---|
| Raw Material | Ex. 3 | Comp. Samp. B | Ex. 4 | Ex. 5 |
| Polyester diol[1] | 500 (0.5) | 500 (0.5) | 500 (0.5) | 500 (0.5) |
| Polyether diol[2] | 500 (0.5) | 500 (0.5) | 500 (0.5) | 500 (0.5) |
| 1,4-butanediol | 113 (2.5) | 110 (2.45) | 203 (4.5) | 203 (4.5) |
| CHDM mixture[3] | 29 (0.4) | 0 | 36 (0.5) | 51 (0.7) |
| 4,4'-MDI | 487 | 431 | 750 | 774 (6.17) |
| Additive Package[4] | 15 | 14 | 19 | 19 |
| % Hard Segment | 38.2 | 34.8 | 49.2 | 50.2 |
| % Haze | 9 | 61 | 28.9 | 7.5 |
| Shore A Hardness | 85 | 86 | 93 | 94 |

[1] A 2000 molecular weight polycaprolactone diol.
[2] A nominally difunctional poly(propylene oxide) having 13% poly(ethylene oxide) end-caps and a molecular weight of 2000.
[3] A mixture of about 56% 1,3-cyclohexanedimethanol and 44% 1,4-cyclohexanedimethanol. Both of the 1,3- and 1,4- cyclohexanedimethanol are present as mixtures in of the cis- and trans-isomers.
[4] A mixture of a slip agent, one or more antioxidants and one or more UV stabilizers.

All of Examples 3-5 have substantially better optical clarity than does Comparative Sample B, indicating the effect of using a chain extender mixture containing 10-15 equivalent-% of the CHDM isomer mixture. Example 3 and Comparative Sample B are softer polymers than are Examples 4 and 5 (Shore A hardness ~85 vs. ~95). The effect on optical clarity is therefore seen over a range of elastomer hardness values and levels of hard segment.

What is claimed is:

1. A thermoplastic polyurethane elastomer which is a polymer of (1) at least one high equivalent weight difunctional compound selected from a polyester diol, a polyether diol, a polycarbonate diol or a mixture thereof, (2) a chain extender mixture and (3) diisocyanatodiphenylmethane (MDI), wherein the chain extender mixture includes at least 60 mole-% of an acyclic diol having a molecular weight of up to about 400 and at least 8 mole-% of a mixture of cyclohexanedimethanol isomers, the mixture of cyclohexanedimethanol isomers including at least 20 weight percent each of 1,3-cyclohexanedimethanol and 1,4-cyclohexanedimethanol, based on the weight of the cyclohexanedimethanol isomers.

2. The thermoplastic polyurethane elastomer of claim 1, wherein the mixture of cyclohexanedimethanol isomers includes cis-1,3-cyclohexanedimethanol, trans-1,3-cyclohexanedimethanol, cis-1,4-cyclohexanedimethanol and trans-1,4-cyclohexanedimethanol.

3. The thermoplastic polyurethane elastomer of claim 1, wherein the chain extender mixture includes 1,4-butanediol and the mixture of cyclohexanedimethanol isomers.

4. The thermoplastic polyurethane elastomer of claim 1, wherein the high equivalent weight difunctional compound includes an A-B type polyester diol corresponding to a reaction product of a glycol and adipic acid.

5. The thermoplastic polyurethane elastomer of claim 1, which has a Shore A durometer hardness of at least 60 and a Shore D durometer hardness of up to 75.

6. The thermoplastic polyurethane elastomer of claim 5, which has a hard segment content of from 35 to 55% by weight.

7. The thermoplastic polyurethane elastomer of claim 1, which is in the form of an injection molded article.

8. The thermoplastic polyurethane elastomer of claim 1, which is in the form of an extruded article.

9. The thermoplastic polyurethane elastomer of claim 1, which exhibits a haze value of no greater than 30%, as measured using an Hunterlab Colorquest Instrument on 6.25× 87.5×162 mm specimens, which specimens are injection molded, using an 80° F. (27° C.) tool, an injection molder barrel temperature of 220° C. at the nozzle and 190° C. in the feed throat with an incremental temperature profile from feed throat to nozzle, at an injection speed of 25.4 mm/sec, and with an in-mold residence time of 110 seconds.

10. The thermoplastic polyurethane elastomer of claim 9, which exhibits a haze value of no greater than 10%.

11. A thermoplastic polyurethane elastomer which is a polymer of (1) at least one high equivalent weight poly(caprolactone) diol or mixture thereof with one or more other high equivalent weight diols, (2) a chain extender mixture that includes at least 60 mole-% of 1,4-butanediol and at least 8 mole-% of a mixture of cyclohexanedimethanol isomers, and (3) at least one diisocyanate, wherein the mixture of cyclohexanedimethanol isomers include at least 40 weight percent each of 1,3-cyclohexanedimethanol and 1,4-cyclohexanedimethanol.

12. The thermoplastic polyurethane elastomer of claim 11, wherein the mixture of cyclohexanedimethanol isomers includes cis-1,3-cyclohexanedimethanol, trans-1,3-cyclohexanedimethanol, cis-1,4-cyclohexanedimethanol and trans-1,4-cyclohexanedimethanol.

13. The thermoplastic polyurethane elastomer of claim 12, which has a Shore A durometer hardness of at least 60 and a Shore D durometer hardness of up to 75.

14. The thermoplastic polyurethane elastomer of claim 13, which has a hard segment content of from 35 to 55% by weight.

15. The thermoplastic polyurethane elastomer of claim 14, which is in the form of an injection molded article.

16. The thermoplastic polyurethane elastomer of claim 15, which exhibits a haze value of no greater than 30%, as measured using an Hunterlab Colorquest Instrument on 6.25× 87.5×162 mm specimens, which specimens are injection molded, using an 80° F. (27° C.) tool, an injection molder barrel temperature of 220° C. at the nozzle and 190° C. in the feed throat with an incremental temperature profile from feed throat to nozzle, at an injection speed of 25.4 mm/sec, and with an in-mold residence time of 110 seconds.

17. The thermoplastic polyurethane elastomer of claim 16, which exhibits a haze value of no greater than 10%.

18. The thermoplastic polyurethane elastomer of claim 13, which is in the form of an extruded article.

* * * * *